UNITED STATES PATENT OFFICE.

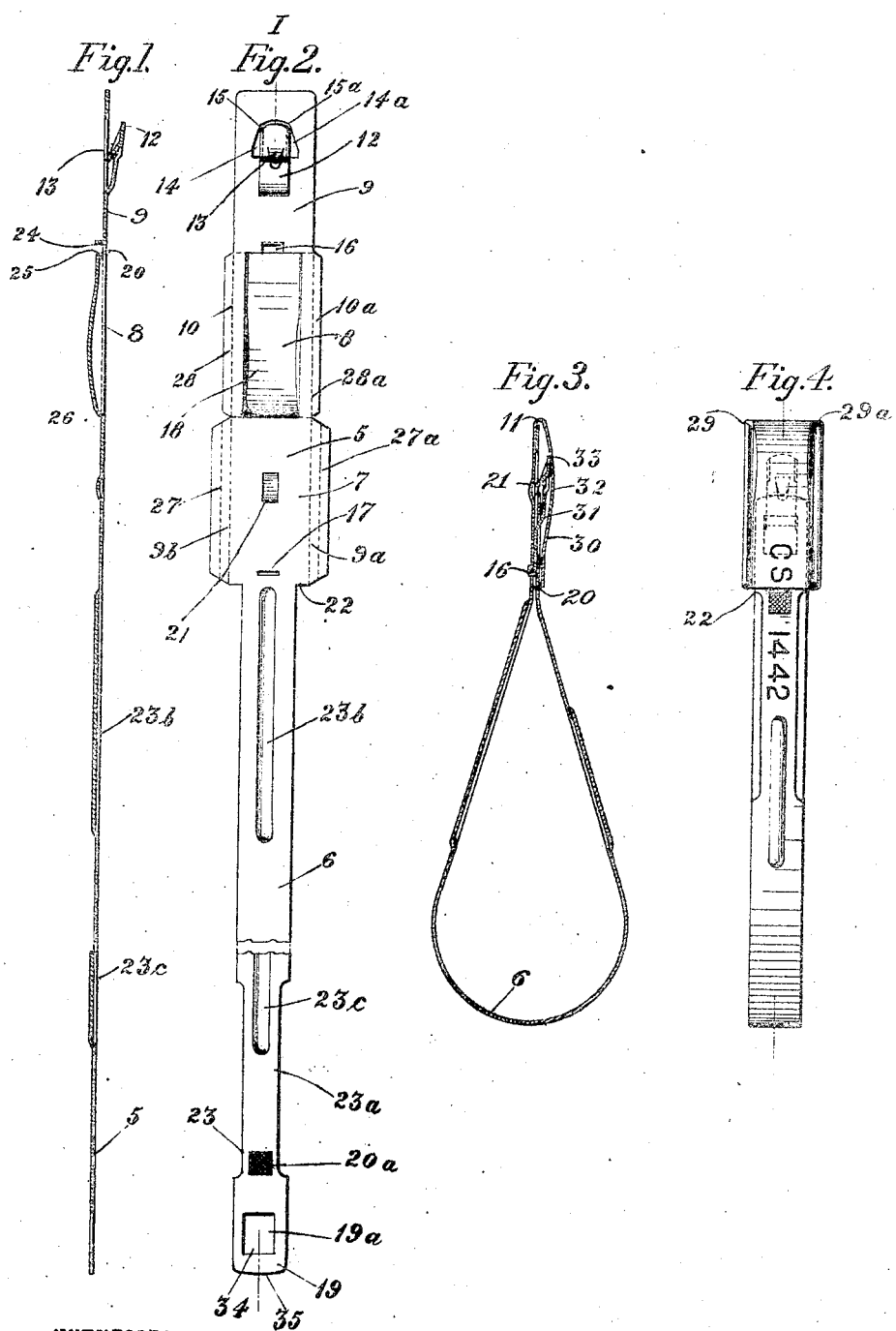

CESARE BARBIERI, OF CHICAGO, ILLINOIS.

SEAL.

No. 887,750.  Specification of Letters Patent.  Patented May 19, 1908.

Application filed March 11, 1907. Serial No. 361,690.

*To all whom it may concern:*

Be it known that I, CESARE BARBIERI, a subject of the King of Italy, residing at Chicago, in the county of Cook and State of Illinois, United States of America, have invented a certain new, useful, and Improved Seal, of which the following, taken in connection with the accompanying drawing, is a specification.

My invention relates to automatic seals designed to be used once only in locking or sealing doors, boxes, pouches, packages and other containing vessels which it may be desirable to seal or lock in such a manner that they may not be opened secretly or without the detachment, destruction or defacement of the seal.

The invention has for its objects: to provide a seal that cannot be opened without detection; to provide a seal that cannot be opened without severing the loop or breaking the locking mechanism; to provide a seal that cannot be picked or surreptitiously opened; to provide a seal in which all the operating mechanism is simple in construction, well protected and not liable to get out of order, and yet readily closed manually by the user thereof without the use of any tool or implement; to provide a seal which is securely locked on the first movement of the insertion of the terminal of the loop into the housing of the locking mechanism; to provide a seal which will be further locked on the first movement to withdraw the free end of the loop from the housing, or any attempt to tamper with the locking mechanism; to provide a seal having means to prevent the successful manipulation of or withdrawal of any pick or skeleton tool that may be inserted into the housing; to provide a seal having an arrangement of parts whereby the free end of the loop is automatically guided into engagement with the locking mechanism; to provide a seal wherein when completed for use all parts are integral; to provide a seal formed of a single strip of metal, wherein the locking mechanism and contour of the seal blank may be made by a single stroke of a die, and the seal formed by a minimum number of bending operations thereafter; to provide a seal presenting smooth surfaces and also a minimum space for the insertion of picking tools; and generally to improve, simplify and cheapen the cost of manufacture of such seals; and to provide a device of this character of greater simplicity of construction and facility and safety in use than has been attained in the devices with which I am familiar. These and other objects are attained by my invention, one embodiment of which is illustrated in the accompanying drawing wherein;

Figure 1 is a longitudinal section on the line I—I of Fig. 2 and illustrates a shaped blank of one of my improved seals having all recesses, apertures and projections provided therein and ready to be formed into the seal shown in Fig. 3. Fig. 2 is a plan view of the said shaped and contoured blank, with the location of the bends required in forming the seal of Fig. 3, indicated by dotted lines. Fig. 3 is a longitudinal section of my improved seal illustrating the relation of the parts when the seal is locked, and Fig. 4 shows my improved seal locked, and illustrates in dotted lines the position in top plan view of the parts shown in section in Fig. 3.

My improved seal is preferably formed of thin sheet metal, having some degree of resiliency, the cheapest and lightest quality of tin-plate being my preferred material.

Referring particularly to the drawing, Figs. 1 and 2, I provide a shaped blank 5 having a flexible strap or loop 6, and toward one end wider portions 7, 8 and 9 which successively decrease in width toward the end. The wider portions 7 and 8 have extending wings $9^a$, $9^b$ and 10, $10^a$ which said pairs of wings are adapted to form the sides or edges of the housing 30 formed by the parts 7 and 8 when bent parallel to each other and the wings successively folded over, as hereinafter described. The part 9 is cut so as to permit the provision of an integral upwardly and rearwardly extending spring catch 12, which is in turn cut out so as to permit the provision of a forwardly and downwardly extending spring barb 13, the said spring catch being formed with ears 14, $14^a$ which may be bent downwardly on the lines 15, $15^a$ to provide projecting hooks for a purpose to be described below. The part 9 is further cut to provide a tongue 16 for purposes of engagement with a slot 17 on the part 7 when the housing is completely formed, and is further cut to form a slot 20 to permit the insertion of the terminal 19 of the strap 6, into the housing 30. The part 8 is provided with an embossed arch 18 for the purpose of guiding the apertured end 19 of the strap 6 into engagement with the locking mechanism and which acts as a cover for the said locking mechanism, when the parts 7, 8 and 9 are bent into a position parallel to each other. The part 7 may be provided with an embossed recess 21 adapted to receive and protect the point of the barb 13. The free end of the strap 6 is provided near the aperture 19ª with a grille 20ª or identifying numbering, lettering or marking, designed to be exposed proximate the edge 22 (Fig. 4) of the housing when the seal has been locked by insertion into the housing, and the consequent engagement with the locking mechanism of the said terminal 19. At the edge of such grille the strap 6 is cut away for a portion of its length as shown at 23, 23ª, making the width of such portion less than the width of the aperture 19ª, and the strap 6 is also provided, between such narrow portion and the wider portion 7 with embossed longitudinal ribs or projections 23ᵇ and 23ᶜ, which will render impossible without detection any severing and reaperturing and remarking of the strap 6 in order to conceal any tampering with the contents of the car or other container.

The complete seal is formed of an integral strip of sheet metal as above described, and when successive right angled bends are made at the points 24, 25, the parts 8 and 9 are brought into parallel relation to each other, and thereupon a further bend of 180 degrees is made at the point 26 in forming the housing. The part 7 is now parallel to the parts 8, 9 and wings 9ª and 9ᵇ may respectively be folded over the wings 10ª and 10 on the dotted lines as indicated at 27, 27ª, and thereupon further folds made respectively on the dotted lines as indicated at 28, 28ª and flat seams presented adjacent the sides as indicated as 29, 29ª (Fig. 4). These steps will provide a secure housing 30, an integral bottom, back and sides, and one having tight seams substantially flush with the arched top, and one having no openings save the narrow slot 20. This construction of housing, especially when taken in connection with the spring catch 12 normally pressing against the roof of the arch 18, and the depending hooked ears 14, 14ª coöperating with the barb 13 normally pressing against the part 7, will prevent any separation of the terminal 19 from the housing 30, by means of the insertion of a pick or tool for the purpose of opening the locking mechanism. Were it possible to insert any instrument through the slot 20, the same would be engaged by the spring catch 12 the barb 13 or the depending ears 14 and its removal prevented.

The operation of my invention is as follows: Assuming the terminal 19 to have been passed through the hasp and staples, or other parts desired to be sealed, the terminal 19 is inserted into the housing through the slot 20 and is pressed against the roof of the arch 18 by the offset 31 (Fig. 3) in the spring catch 12. As it is pushed toward the rear of the housing, it will be forced downward by the sloping portion 32 of the arch 18 and when the rim 34 of the aperture 19ª passes the upturned point 33 of spring catch 12, the said catch will spring through the aperture 19ª thereby preventing withdrawal of the terminal from the housing. Upon retraction of the terminal 19, the barb 13 will be depressed until the extreme edge 35 of the terminal passes over the point of the barb, whereupon the barb will spring downward into the recess formed in the part 9 by the cutting out of the catch 12 and into the recess 21 and thus fully locking the parts and further render ineffectual any effort to withdraw the terminal 19 from the housing 30. Any attempt to open the seal by working the terminal 19 back and forth in the housing will cause it to abut against the offset barb 13 and hooked ears 14, 14ª and tend to force them downward against the part 7 and thereby press the point 33 of the catch 12 against the roof 32 of the arch 18.

From the foregoing it will be seen that I have provided a seal that may be made with all parts integral, from a single piece of material, by a single stroke of a forming die and a small amount of bending thereafter, thus obviating any provision for castings, or machining or assembling of parts, and thereby cheapening the cost of manufacture of such seals; and that I have further provided a seal which combines positiveness and efficiency of locking mechanism and adequate protection therefor with flatness and consequent reduction in material required and thus one of minimum weight and bulk.

It will be evident that without departure from my invention the coöperating tongue 16 and slot 17, the recess 21, the ears 15, 15ª or the guide 32, might be omitted, either singly or together, or other elements for the purposes substituted therefor. Further changes will occur to those skilled in the art and are intended to be comprised in my invention and covered by my claims.

While I have described my seal as made of tin plate it is obvious that other available metals and materials might be substituted in lieu thereof. Furthermore the strap 6 and the housing and locking mechanism, 7, 8 and 9, might be made separately, in which event it would be necessary to provide the strap 6 with an additional aperture 19ª at the other end or the equivalent. It would then be necessary in closing the seal to insert the two ends 19 into the housing together and cause them to engage with the spring catch 12 as heretofore described.

Having thus described my invention and illustrated its use, what I claim as new and desire to secure by Letters Patent is the following:

1. In combination in a seal, a housing provided with a strip 9, a tongue 12 punched out of said strip 9, a barb 13 on the tongue extending rearwardly and having its end below the face of the strip 9, and a strap provided with an apertured end for engaging the tongue and of greater width than the width of the tongue.

2. A seal comprising in combination a housing open at one end, a spring catch provided with ears upon its side edges adjacent its free end located within the housing and projecting towards the closed end thereof, a barb projecting from said catch and in the reverse direction, together with an apertured strap adapted to be inserted into the housing and drawn over the catch past the barb and ears, said barb and ears acting to prevent its removal when so placed.

3. A self locking car seal consisting of a single piece of metal having an aperture at one end and a plurality of wider portions at the other end, one of the said wider portions being provided with a spring catch having thereon a reversely pointed barb and ears, and another of said portions with an arch to guide the apertured end, said arched portion and the next adjacent wide portion being provided with wings upon their edges, and a coöperating tongue and slot adapted to interlock when said wider portions are successively folded over to form a housing.

4. A self locking car seal consisting of a single piece of metal having an aperture at one end and a plurality of wider portions at the other end, one of the said wider portions being provided with a spring catch 12, a reversely pointed barb 13, and ears 14 14ª, and another of said portions with an arch to guide the apertured end, said wider portions being adapted to be successively folded over in substantially the same plane to form a housing.

5. A seal comprising a strap having an apertured end and a housing portion formed in three thicknesses by bending the outer end forward upon itself and then bending the doubled portion thus formed forward again to bring the first bend adjacent the inner end of the strap, the housing being transversely slitted at the point of the first bend to permit of the passage of the apertured end and the end of the housing first bent being provided with locking means for engaging the apertured end.

In testimony whereof, I have hereunder signed my name in the presence of the two subscribing witnesses.

CESARE BARBIERI.

Witnesses:
  PAUL CARPENTER,
  JAMES NICHOLAS LORENZ.